United States Patent
Miki

(10) Patent No.: US 11,181,618 B2
(45) Date of Patent: Nov. 23, 2021

(54) SENSOR DATA INTEGRATION DEVICE, SENSOR DATA INTEGRATION METHOD AND COMPUTER READABLE MEDIUM

(71) Applicant: Mitsubishi Electric Corporation, Tokyo (JP)

(72) Inventor: Yohei Miki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 251 days.

(21) Appl. No.: 16/473,585

(22) PCT Filed: Feb. 20, 2017

(86) PCT No.: PCT/JP2017/006228
§ 371 (c)(1),
(2) Date: Jun. 25, 2019

(87) PCT Pub. No.: WO2018/150591
PCT Pub. Date: Aug. 23, 2018

(65) Prior Publication Data
US 2020/0150234 A1 May 14, 2020

(51) Int. Cl.
*G01S 7/48* (2006.01)
*G01S 17/89* (2020.01)

(52) U.S. Cl.
CPC ............ *G01S 7/4808* (2013.01); *G01S 17/89* (2013.01)

(58) Field of Classification Search
CPC ......... G01S 17/89; G01S 7/4808; G01S 17/87
See application file for complete search history.

(56) References Cited

U.S. PATENT DOCUMENTS

| 10,452,071 B1 * | 10/2019 | Ebrahimi Afrouzi ........................ B25J 9/1676 |
| 2012/0065841 A1 | 3/2012 | Nagata et al. |
| 2015/0362921 A1 * | 12/2015 | Hanaoka .............. G05D 1/0274 701/23 |

FOREIGN PATENT DOCUMENTS

| JP | 61-172082 A | 8/1986 |
| JP | 61-283885 A | 12/1986 |
| JP | 4-238285 A | 8/1992 |
| JP | 8-287214 A | 11/1996 |
| JP | 2003-167628 A | 6/2003 |
| JP | 2007-49219 A | 2/2007 |

(Continued)

OTHER PUBLICATIONS

International Search Report (PCT/ISA/210) issued in PCT/JP2017/006228, dated May 16, 2017.

(Continued)

*Primary Examiner* — Bryan Bui
(74) *Attorney, Agent, or Firm* — Birch, Stewart, Kolasch & Birch, LLP

(57) ABSTRACT

A missing area specification unit (23) specifies, in a coverage area assigned to a sensor in charge to detect a position, a missing area that is not detected by assigned data being sensor data acquired by the sensor in charge. An interpolation data extraction unit (24) extracts sensor data whereby the missing area is detected, the sensor data being acquired by a sensor other than the sensor in charge, as interpolation data. A detection data generation unit (26) generates detection data of the coverage area by integrating the assigned data and the interpolation data.

10 Claims, 11 Drawing Sheets

(56) References Cited

FOREIGN PATENT DOCUMENTS

JP    2007-137111  A    6/2007
WO    WO 2010/140239 A1 12/2010

OTHER PUBLICATIONS

Indian Office Action for Indian Application No. 201947030481, dated Nov. 25, 2020, with English translation.
Office Action issued in corresponding German Application No. 11 2017 006 844.4 dated Apr. 20, 2020.
Shen, H. et al., "Missing Information Reconstruction of Remote Sensing Data: A Technical Review"; IEEE Geoscience and Remote Sensing Magazine, vol. 3, 2015, No. 3, p. 61-85.

* cited by examiner

Fig. 2

| SENSOR | RELATIVE POSITION INFORMATION |
|---|---|
| SENSOR 101A | TRANSFORMATION MATRIX A |
| SENSOR 101B | TRANSFORMATION MATRIX B |
| SENSOR 101C | TRANSFORMATION MATRIX C |

| | 32 |
|---|---|
| SENSOR | COVERAGE AREA 42 |
| SENSOR 101A | COVERAGE AREA 42A |
| SENSOR 101B | COVERAGE AREA 42B |
| SENSOR 101C | COVERAGE AREA 42C |

SENSOR DATA INTEGRATION DEVICE, SENSOR DATA INTEGRATION METHOD AND COMPUTER READABLE MEDIUM

TECHNICAL FIELD

The present invention relates to a technique to integrate sensor data acquired by a plurality of sensors.

BACKGROUND ART

By detecting an object such as an obstacle by using a sensor, and performing control, etc. over a moving body such as a vehicle, safety and convenience have been improved.

There is a case wherein a plurality of sensors are mounted on the moving body. In the case, it is necessary to integrate and utilize sensor data acquired by each sensor.

Patent Literature 1 discloses a technique to set a priority order of each sensor beforehand, and to reduce processing loads as a whole.

CITATION LIST

Patent Literature

Patent Literature 1: WO2010-140239 A

SUMMARY OF INVENTION

Technical Problem

There is a sensor such as a light detection and ranging (LiDAR) whereby laser emitting pulsed light is delivered, and scattered light resulting from the delivered laser is measured, so as to analyze the distance to a distant target and features of the target. When a surrounding area is monitored by using a plurality of sensors such as LiDARs, it is possible to monitor a broader area by integrating information of each sensor into one piece of information. However, the number of pieces of sensor data acquired increases as the number of sensors increases. Therefore, when all the pieces of sensor data acquired are processed, the processing load is increased.

When a surrounding area is monitored by using a plurality of sensors such as LiDARs, all the priority degrees of each sensor are the same. Therefore, as in the technique disclosed in Patent Literature 1, it is difficult to reduce the processing load as a whole by setting the priority degrees of each sensor.

The present invention is aimed at integrating a plurality of pieces of sensor data efficiently.

Solution to Problem

A sensor data integration device according to one aspect of the present invention includes:

a missing area specification unit to specify, in a coverage area assigned to a sensor in charge to detect a position, a missing area that is not detected by assigned data being sensor data acquired by the sensor in charge;

an interpolation data extraction unit to extract, as interpolation data, sensor data whereby the missing area specified by the missing area specification unit is detected, the sensor data being acquired by a sensor other than the sensor in charge; and a detection data generation unit to generate detection data of the coverage area by integrating the assigned data, and the interpolation data extracted by the interpolation data extraction unit.

Advantageous Effects of Invention

The present invention interpolates a missing area that is not detected by a sensor in charge, in a coverage area assigned to the sensor in charge, by using sensor data acquired by another sensor. In this manner, it is possible to efficiently integrate pieces of sensor data.

BRIEF DESCRIPTION OF DRAWINGS

FIG. 2 is a diagram illustrating information stored in a sensor position storage unit 31 according to the first embodiment;

FIG. 3 is a diagram illustrating information stored in a coverage area storage unit 32 according to the first embodiment;

DESCRIPTION OF EMBODIMENT

First Embodiment

*Explanation of Configuration*

Figure 1:
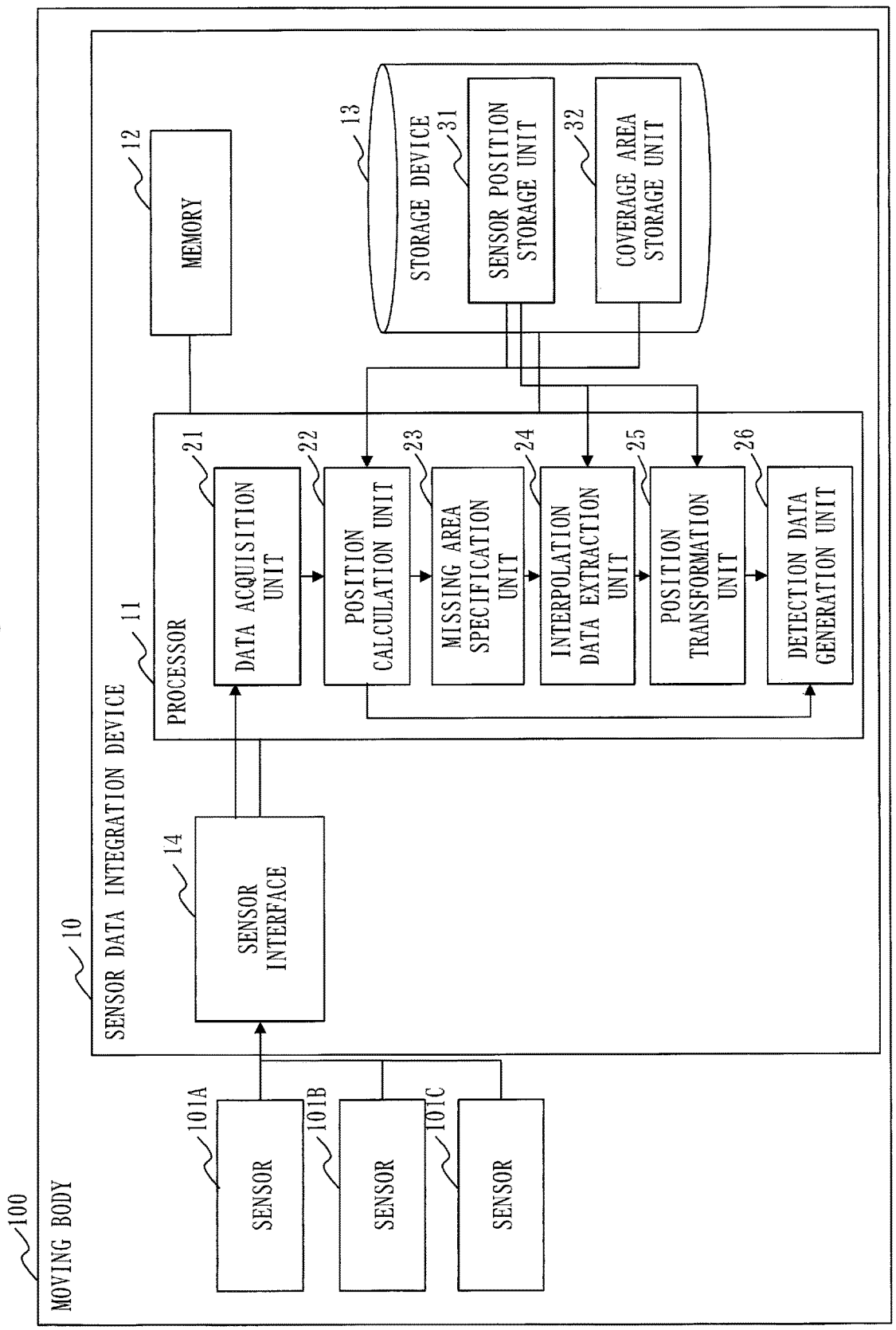
FIG. 1 is a configuration diagram of a sensor data integration device 10 according to a first embodiment.

With reference to FIG. 1, a configuration of a sensor data integration device 10 according to a first embodiment will be described.

FIG. 1 illustrates a state wherein the sensor data integration device 10 is mounted on a moving body 100. The moving body 100 is a vehicle, a ship, etc. In the first embodiment, the moving body 100 is a vehicle.

Note that the sensor data integration device 10 may be implemented in an integrated form or an inseparable form with, or in a detachable form or a separable form with, the moving body 100 or other components illustrated.

The sensor data integration device 10 is a computer.

The sensor data integration device 10 is equipped with hardware components such as a processor 11, a memory 12, a storage device 13, and a sensor interface 14. The processor 11 is connected to other hardware components via a signal line to control the other hardware components.

The processor 11 is an integrated circuit (IC) to perform processing. As a specific example, the processor 11 is a central processing unit (CPU), a digital signal processor (DSP), or a graphics processing unit (GPU).

The memory 12 is a storage device to temporarily store data. As a specific example, the memory 12 is a static random access memory (SRAM) or a dynamic random access memory (DRAM).

A storage device 13 is storage to store data. As a specific example, the storage device 13 is a hard disk drive (HDD). Further, the storage device 13 may be a portable storage medium such as a secure digital (SD) (registered trademark) memory card, a compact flash (CF), an NAND flash memory, a flexible disk, an optical disc, a compact disc, a Blue-ray (registered trademark) disc, a digital versatile disk (DVD), etc.

The sensor interface 14 is an interface to communicate with sensors 101 mounted on the moving body 100. As a specific example, the sensor interface 14 is a sensor data acquisition large scale integration (LSI).

In FIG. 1, the sensor interface 14 is connected to three pieces of sensors 101 of a sensor 101A through a sensor 101C. It is only necessary for the sensor interface 14 to be connected to a plurality of sensors 101, and the number is not limited to three. In the first embodiment, the sensors 101 are assumed to be LiDARs.

The sensor data integration device 10 is equipped with, as functional components, a data acquisition unit 21, a position calculation unit 22, a missing area specification unit 23, an interpolation data extraction unit 24, a position transformation unit 25, and a detection data generation unit 26. The functions of the data acquisition unit 21, the position calculation unit 22, the missing area specification unit 23, the interpolation data extraction unit 24, the position transformation unit 25 and the detection data generation unit 26 are realized by software.

The storage device 13 stores a program to realize the functions of the data acquisition unit 21, the position calculation unit 22, the missing area specification unit 23, the interpolation data extraction unit 24, the position transformation unit 25 and the detection data generation unit 26. The program is read into the memory 12 by the processor 11, and executed by the processor 11. In this manner, the functions of the data acquisition unit 21, the position calculation unit 22, the missing area specification unit 23, the interpolation data extraction unit 24, the position transformation unit 25 and the detection data generation unit 26 are realized.

Further, the storage device 13 realizes functions of a sensor position storage unit 31 and a coverage area storage unit 32.

FIG. 1 illustrates only one processor 11. However, the sensor data integration device 10 may be equipped with a plurality of processors replacing the processor 11. The plurality of processors share execution of the program to realize the functions of the data acquisition unit 21, the position calculation unit 22, the missing area specification unit 23, the interpolation data extraction unit 24, the position transformation unit 25 and the detection data generation unit 26.

*Explanation of Operation*

With reference to FIG. 2 through FIG. 9, an operation of the sensor data integration device 10 according to the first embodiment will be described.

The operation of the sensor data integration device 10 according to the first embodiment corresponds to a sensor data integration method according to the first embodiment. Further, the operation of the sensor data integration device 10 according to the first embodiment corresponds to a process of a sensor data integration program according to the first embodiment.

With reference to FIG. 2, information stored in the sensor position storage unit 31 according to the first embodiment will be described.

The sensor position storage unit 31 stores, for each sensor 101, relative position information 41 of the sensor 101. In the first embodiment, a transformation matrix is stored as the relative position information 41. The transformation matrix is a matrix for transforming a coordinate system of sensor data acquired by the sensors 101 into a global coordinate system, and is a coordinate indicating rotation and translation of the coordinate system.

With reference to FIG. 3, information stored in the coverage area storage unit 32 according to the first embodiment will be described.

The coverage area storage unit 32 stores for each sensor 101 a coverage area 42 assigned to the sensor 101. The coverage area 42 is an area where a sensor 101 is in charge of detection of an object such as an obstacle. The coverage area 42 is expressed in a relative coordinate system taking a position of the sensor 101 as a reference, for example.

Figure 4:
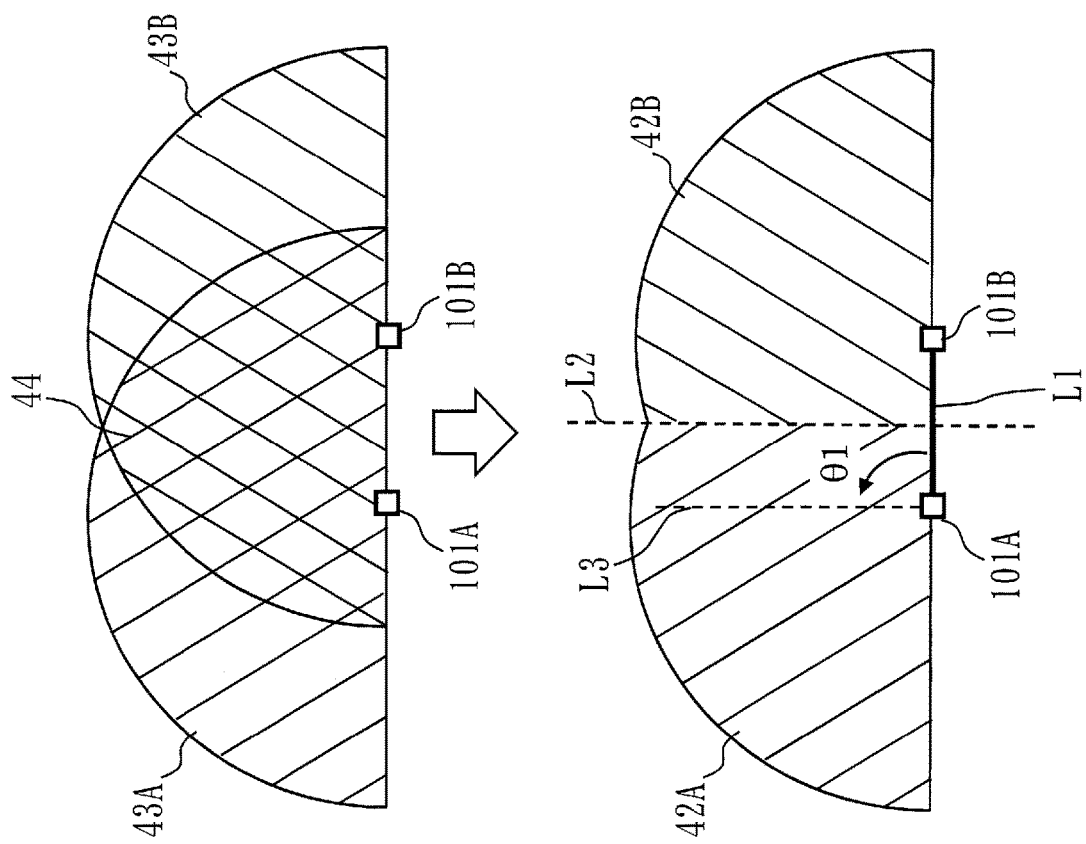
FIG. 4 is an explanatory diagram of an example of a coverage area 42 according to the first embodiment.

With reference to FIG. 4, an example of the coverage areas 42 according to the first embodiment will be described.

FIG. 4 illustrates a state viewed from an upper side in a vertical direction. An area 43A detectable by a sensor 101A and an area 43B detectable by a sensor 101B overlap with each other in an overlapping area 44. In this case, for example, each position inside the overlapping area 44 is regarded as a coverage area 42 of the sensor 101 closer to the position.

Specifically, a perpendicular bisector L2 of a straight line L1 connecting the sensor 101A and the sensor 101B is drawn. A straight line drawn by translating the perpendicular bisector L2 so as to pass through the sensor 101A is regarded as a straight line L3. An angle around a vertical axis of the straight line L3 relative to the straight line L1 is regarded as an angle $\theta 1$. Then, an area included in the area 43A detectable by the sensor 101A among an area with an angle equal to or more than $\theta 1$ but equal to or less than $\theta 1+\pi$. Further, an area on the sensor 101A side relative to the perpendicular bisector L2 among the other area 43A detectable by the sensor 101A is also regarded as the coverage area 42A of the sensor 101A.

Then, an area from which the coverage area 42A of the sensor 101A is removed, among the area 43B detectable by the sensor 101B is regarded as a coverage area 42B.

Figure 5:
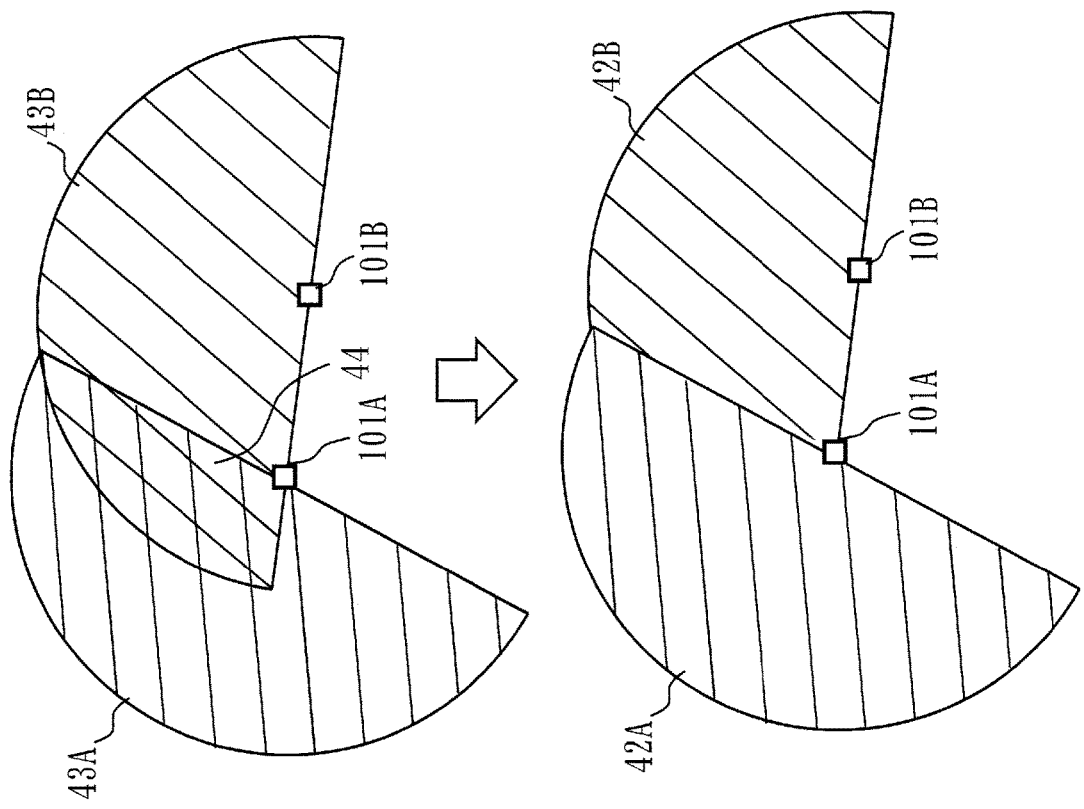
FIG. 5 is an explanatory diagram of an example of the coverage area 42 according to the first embodiment.

With reference to FIG. 5, another example of the coverage area 42 according to the first embodiment will be described.

In FIG. 5, a state viewed from an upper side in a vertical direction is illustrated as with FIG. 4. The area 43A detectable by the sensor 101A and the area 43B detectable by the sensor 101B overlap with each other in the overlapping area 44, similarly to the case of FIG. 4. In this case, for example, the overlapping area 44 is regarded as a coverage area 42 of one sensor 101.

Specifically, the area 43A detectable by the sensor 101A is regarded as the coverage area 42A of the sensor 101A. Then, an area from which the overlapping area 44 is removed among the area 43B detectable by the sensor 101B is regarded as the coverage area 42B.

The coverage areas 42 of respective sensors 101 may be overlapping in part.

Figure 6:
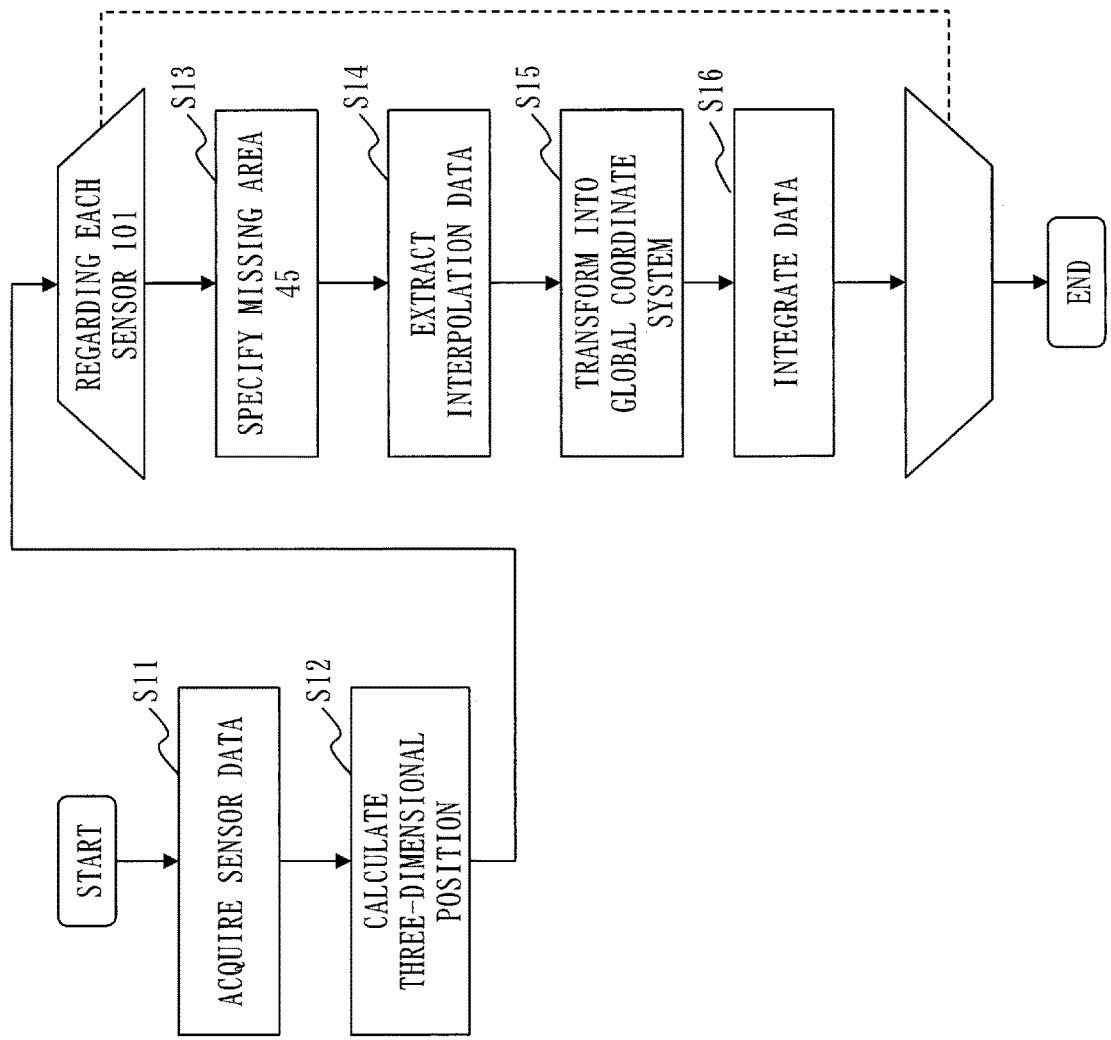
FIG. 6 is a flowchart illustrating an operation of the sensor data integration device 10 according to the first embodiment.

With reference to FIG. 6, the operation of the sensor data integration device 10 according to the first embodiment will be described.

As a premise of a process illustrated in FIG. 6, the information described above is stored in the sensor position storage unit 31 and the coverage area storage unit 32.

(Step S11: Data Acquisition Process)

The data acquisition unit 21 acquires sensor data acquired by each sensor 101 via the sensor interface 14. The data acquisition unit 21 writes the sensor data acquired in the memory 12.

As described above, in the first embodiment, the sensors 101 are LiDARs. LiDARs perform laser irradiation emitting pulsed light, while shifting an irradiation angle of the laser little by little. LiDARs measure scattered light with respect to the laser, and acquire sensor data. Therefore, the data acquisition unit 21 acquires a plurality of pieces of sensor data ordered from each sensor 101.

Figure 7:
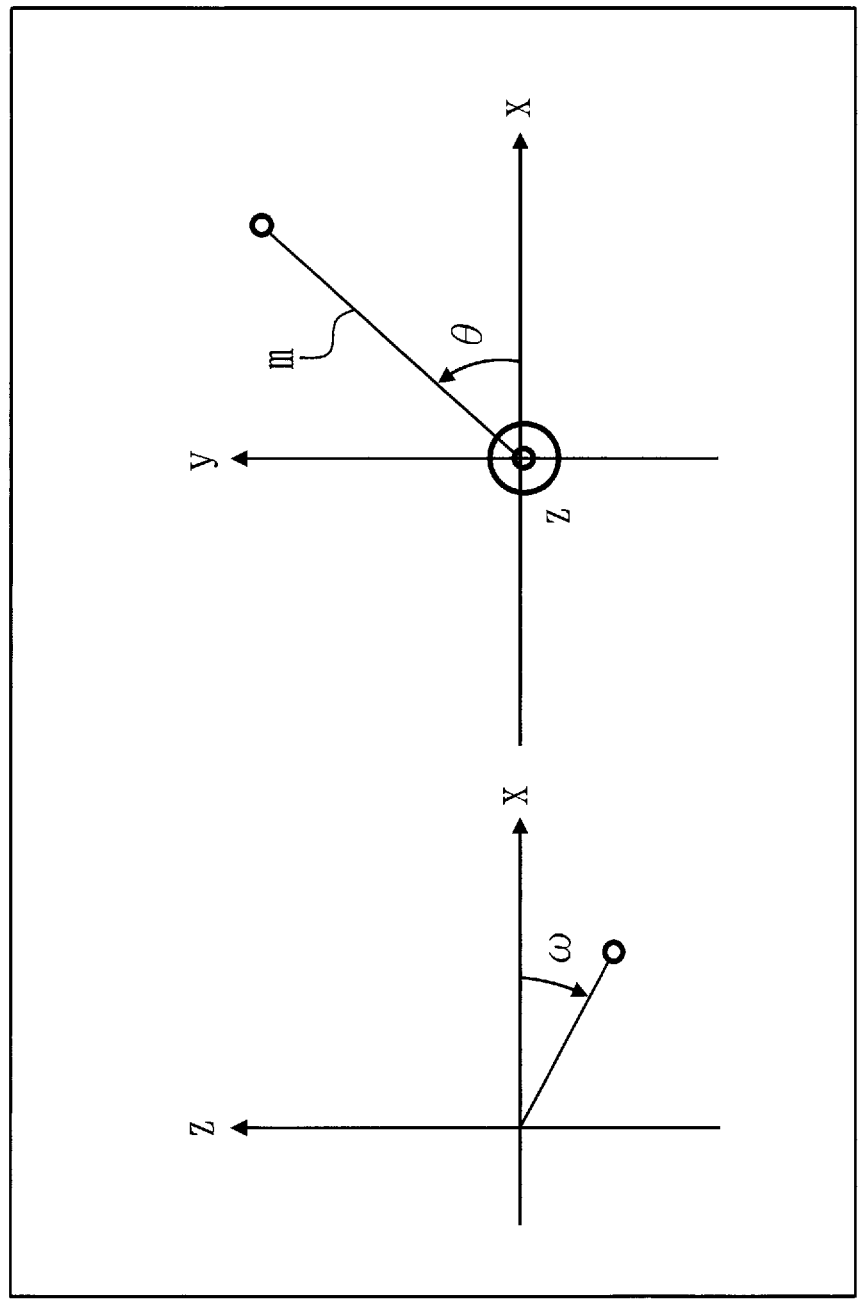
FIG. 7 is an explanatory diagram of sensor data according to the first embodiment.

As illustrated in FIG. 7, each piece of sensor data indicates a distance m to an object in each angle ($\theta$, $\omega$) by taking a position of a sensor 101 as a center.

(Step S12: Position Calculation Process)

The position calculation unit 22 calculates a three-dimensional position indicated by each piece of sensor data acquired in the step S11.

Specifically, the position calculation unit 22 reads out each piece of sensor data from the memory 12. The position calculation unit 22 calculates a distance X on an x-axis, a distance Y on an y-axis and a distance Z on a z-axis, by using a position of a sensor 101 being an acquisition source of the sensor data as a reference, from the angle ($\theta$, $\omega$) and the distance m indicated in the sensor data. The distance X on the x-axis is calculated by "$X = m \times \cos(\omega) \times \cos(\theta)$". The distance Y on the y-axis is calculated by "$Y = m \times \cos(\omega) \times \sin(\theta)$". The distance Z on the z-axis is calculated by "$Z = m \times \sin(\omega)$". The position calculation unit 22 writes the three-dimensional position calculated in the memory 12.

Processes from a step S13 through a step S19 are performed by using each sensor 101 as a sensor in charge.

(Step S13: Area Specification Process)

The missing area specification unit 23 specifies a missing area 45 that is not detected in assigned data being sensor data acquired by a sensor in charge, in the coverage area 42 assigned to the sensor in charge. That is, the missing area specification unit 23 specifies the missing area 45 whereof assigned data is missing due to a reason such that the area is in a dead angle from the sensor in charge. That is, the missing area 45 is an area inside the coverage area 42 which cannot be detected by the sensor in charge.

Figure 8:
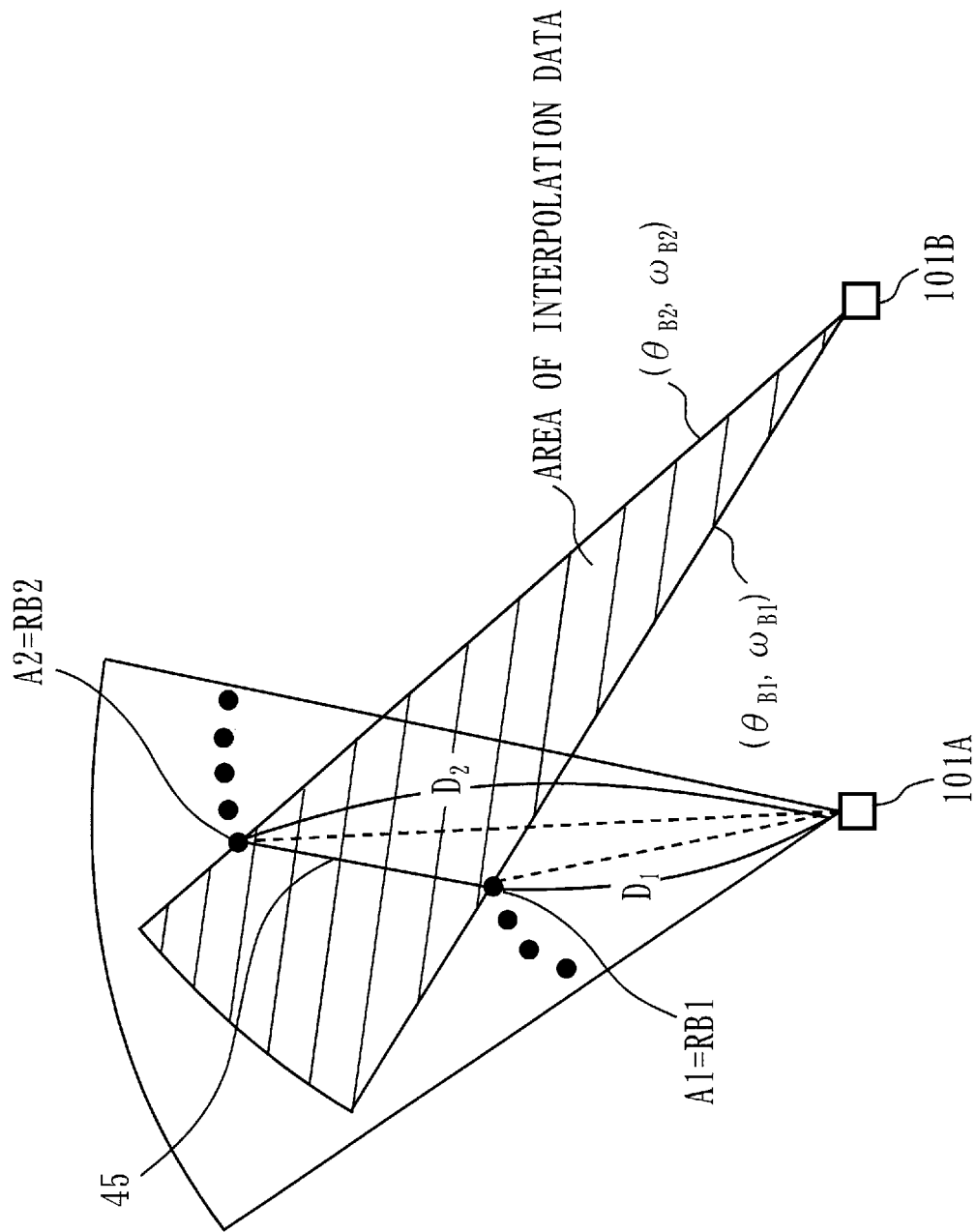
FIG. 8 is an explanatory diagram of a missing area 45 according to the first embodiment.

Specifically, the missing area specification unit 23 reads out the coverage area 42 corresponding to the sensor in charge from the coverage area storage unit 32. The missing area specification unit 23 reads out a three-dimensional position inside the coverage area 42 in three-dimensional positions of assigned data being the sensor data acquired by the sensors in charge. As illustrated in FIG. 8, the missing area specification unit 23 specifies, as a missing area 45, an area wherein a distance between positions indicated in adjacent assigned data is equal to or more than a first threshold value. In FIG. 8, since a difference between a distance D1 and a distance D2 is equal to or more than the first threshold value, a space between the sensor data A1 and the sensor data A2 is specified as the missing area 45. The missing area specification unit 23 writes the missing area 45 specified in the memory 12.

The first threshold value is stored in the memory 12 set beforehand. The first threshold value is set according to an accuracy degree of distance detection of the sensors 101.

(Step S14: Interpolation Data Extraction Process)

An interpolation data extraction unit 24 extracts, as interpolation data, sensor data whereby the missing area 45 specified in the step S13 is detected, the sensor data being acquired by a sensor 101 other than the sensor in charge.

Specifically, the interpolation data extraction unit 24 reads the missing area 45 from the memory 12. The interpolation data extraction unit 24 calculates an angle of the other sensor 101 corresponding to the missing area 45 based on relative position information stored in the sensor position storage unit 31. The interpolation data extraction unit 24 extracts the sensor data on the angle calculated as interpolation data.

With reference to FIG. 8, explanation will be provided specifically.

The sensor 101A is a sensor in charge. Further, a coordinate system of the sensor 101A is regarded as a global coordinate system. Furthermore, a transformation matrix expressing a relative position of the sensor 101B with respect to the global coordinate system is regarded as a transformation matrix R. That is, the transformation matrix R is a matrix to transform the coordinate system of the sensor 101B into the coordinate system of the sensor 101A. Therefore, by multiplying the sensor data B in the coordinate system of the sensor 101B by the transformation matrix R, it is possible to transform the sensor data B into the sensor data A in the coordinate system of the sensor 101A. That is, $A = RB$.

Two points in the both ends of the missing area 45 in the sensor 101A are sensor data A1 and sensor data A2. The interpolation data extraction unit 24 specifies sensor data B1 in the sensor 101B corresponding to the sensor data A1 by $A1 = RB1$. Similarly, the interpolation data extraction unit 24 specifies sensor data B2 in the sensor 101B corresponding to the sensor data A2 by $A2 = RB2$. By specifying angles ($\theta$, $\omega$) of the sensor data B1 and the sensor data B2, the interpolation data extraction unit 24 specifies an angle ($\theta$, $\omega$) in the coordinate system of the sensor 101B corresponding to two points on the both ends of the missing area 45. Then, the interpolation data extraction unit 24 extracts, as interpolation data, sensor data between the sensor data between two points on the both ends of the missing area 45 specified.

Figure 9:
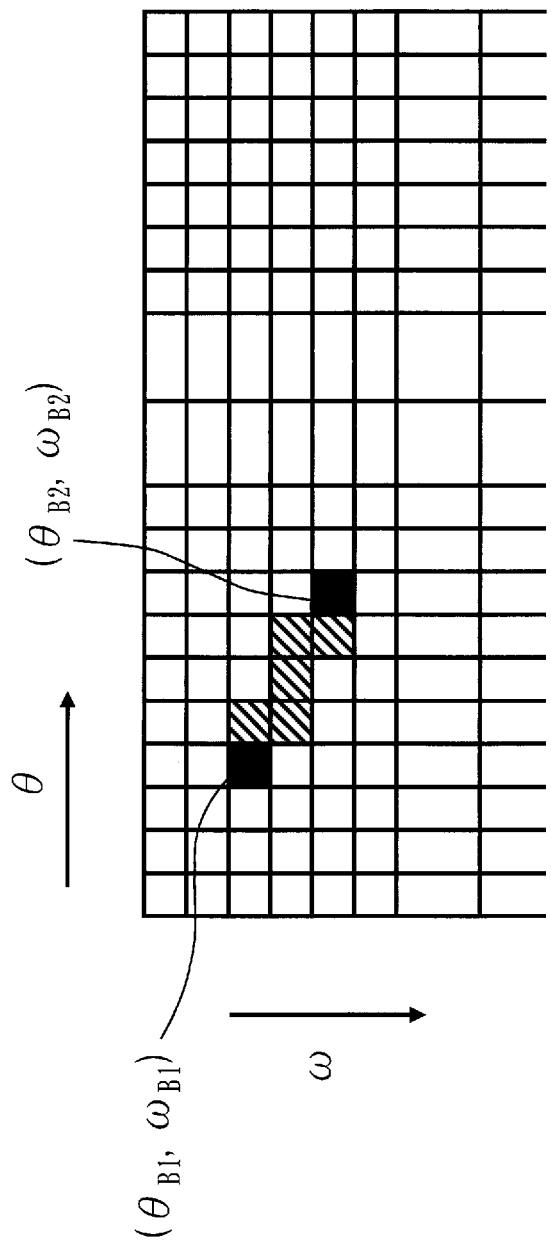
FIG. 9 is an explanatory diagram of an interpolation data extraction process according to the first embodiment.

For example, as illustrated in FIG. 9, the data acquisition unit 21 in the step S11 stores each sensor data in corresponding fields in a table in which angles $\theta$ are represented in rows, and angles $\omega$ are represented in columns. Then, the interpolation data extraction unit 24 extracts, as interpolation data, sensor data in fields where a line connecting fields of two points on the both ends of the missing area 45 is drawn passes on the table.

That is, in FIG. 9, sensor data of the field (hatched field) where a line connecting the field of the angle ($\theta_{B1}$, $\omega_{B1}$) of the sensor data B1 and the field of the angle ($\theta_{B2}$, $\omega_{B2}$) of the sensor data B2 passes is extracted as interpolation data.

(Step S15: Position Transformation Process)

The position transformation unit 25 transforms a coordinate system of a position of assigned data, and a coordinate system of a position of interpolation data extracted in the step S14, into a global coordinate system.

Specifically, the position transformation unit 25 transforms the coordinate systems by a transformation matrix being relative position information stored in the sensor position storage unit 31.

(Step S16: Detection Data Generation Process)

The detection data generation unit 26 generates detection data of the coverage area 42 by integrating the assigned data, and the interpolation data whose coordinate system has been transformed in the step S15.

*Effect of First Embodiment*

As described above, the sensor data integration device 10 according to the first embodiment interpolates a missing area 45 that is not detected by a sensor in charge, in a coverage area 42 assigned to the sensor in charge, by using sensor data acquired by another sensor 101. In this manner, it is possible to integrate sensor data effectively.

That is, by reducing a processing load as a whole, and interpolating the missing area 45 with the sensor data acquired by the other sensor 101, it is possible to suitably specify the position and the shape of an object.

\*\*\*Other Configurations\*\*\*

<First Variation>

In the first embodiment, the sensors 101 are LiDARs. However, the sensors 101 are not limited to LiDARs, and the sensors 101 may be other sensors as far as the sensors 101 detect positions.

<Second Variation>

In the first embodiment, the functions of the data acquisition unit 21, the position calculation unit 22, the missing area specification unit 23, the interpolation data extraction unit 24, the position transformation unit 25 and the detection data generation unit 26 are realized by software. However, as a second variation, the functions of the data acquisition unit 21, the position calculation unit 22, the missing area specification unit 23, the interpolation data extraction unit 24, the position transformation unit 25 and the detection data generation unit 26 may be realized by hardware. Regarding the second variation, parts different from those of the first embodiment will be described.

Figure 10:
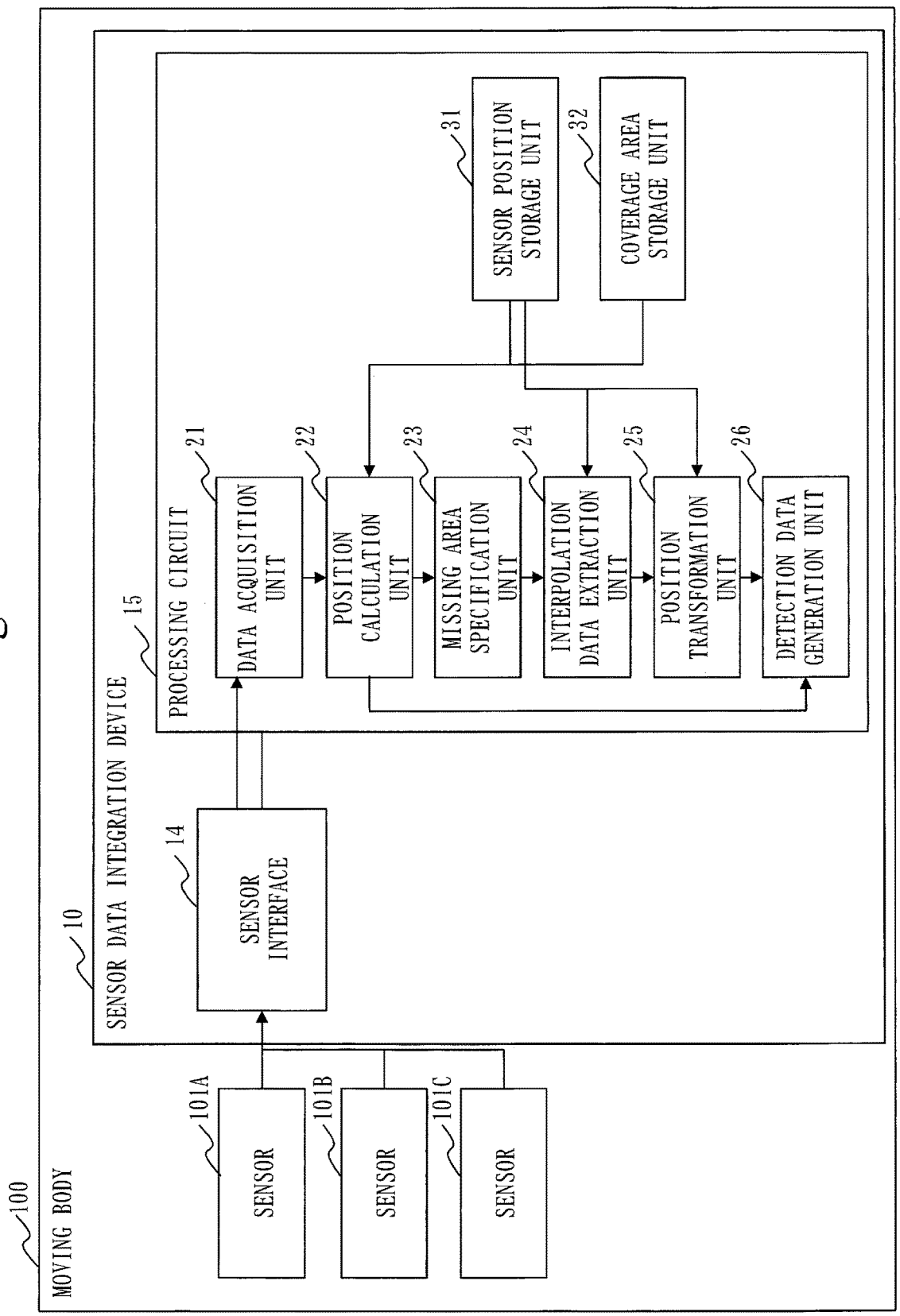
FIG. 10 is a configuration diagram of the sensor data integration device 10 according to a second variation.

With reference to FIG. 10, a configuration of the sensor data integration device 10 according to the second variation will be described.

When the functions of the data acquisition unit 21, the position calculation unit 22, the missing area specification unit 23, the interpolation data extraction unit 24, the position transformation unit 25 and the detection data generation unit 26 are realized by hardware, the sensor data integration device 10 is equipped with a processing circuit 15 instead of the processor 11, the memory 12 and the storage device 13. The processing circuit 15 is a dedicated electronic circuit to realize the functions of the data acquisition unit 21, the position calculation unit 22, the missing area specification unit 23, the interpolation data extraction unit 24, the position transformation unit 25 and the detection data generation unit 26, and the functions of the memory 12 and the storage device 13.

It is assumed that the processing circuit 15 is a single circuit, a combined circuit, a programmed processor, a parallel programmed processor, a logic integrated circuit (logic IC), a gate array (GA), an application specific integrated circuit (ASIC), or a field-programmable gate array (FPGA).

The function of the processing circuit 15 may be realized by one processing circuit 15, or may be realized by distributing the functions of the data acquisition unit 21, the position calculation unit 22, the missing area specification unit 23, the interpolation data extraction unit 24, the position transformation unit 25 and the detection data generation unit 26 to a plurality of processing circuits 15.

<Third Variation>

As a third variation, a part of the functions may be realized by hardware, and the other functions may be realized by software. That is, a part of the functions of the processing circuit 15 may be realized by hardware, and the other functions may be realized by software.

The processor 11, the memory 12, the storage device 13 and the processing circuit 15 are collectively referred to as "processing circuitry". That is, the functions of each functional component are realized by processing circuitry.

Second Embodiment

A second embodiment is different from the first embodiment in that an area distant from a sensor 101 is also interpolated with sensor data of another sensor 101. In the second embodiment, this different part will be described, and the explanation of the same parts is omitted.

\*\*\*Explanation of Operation\*\*\*

Figure 11:
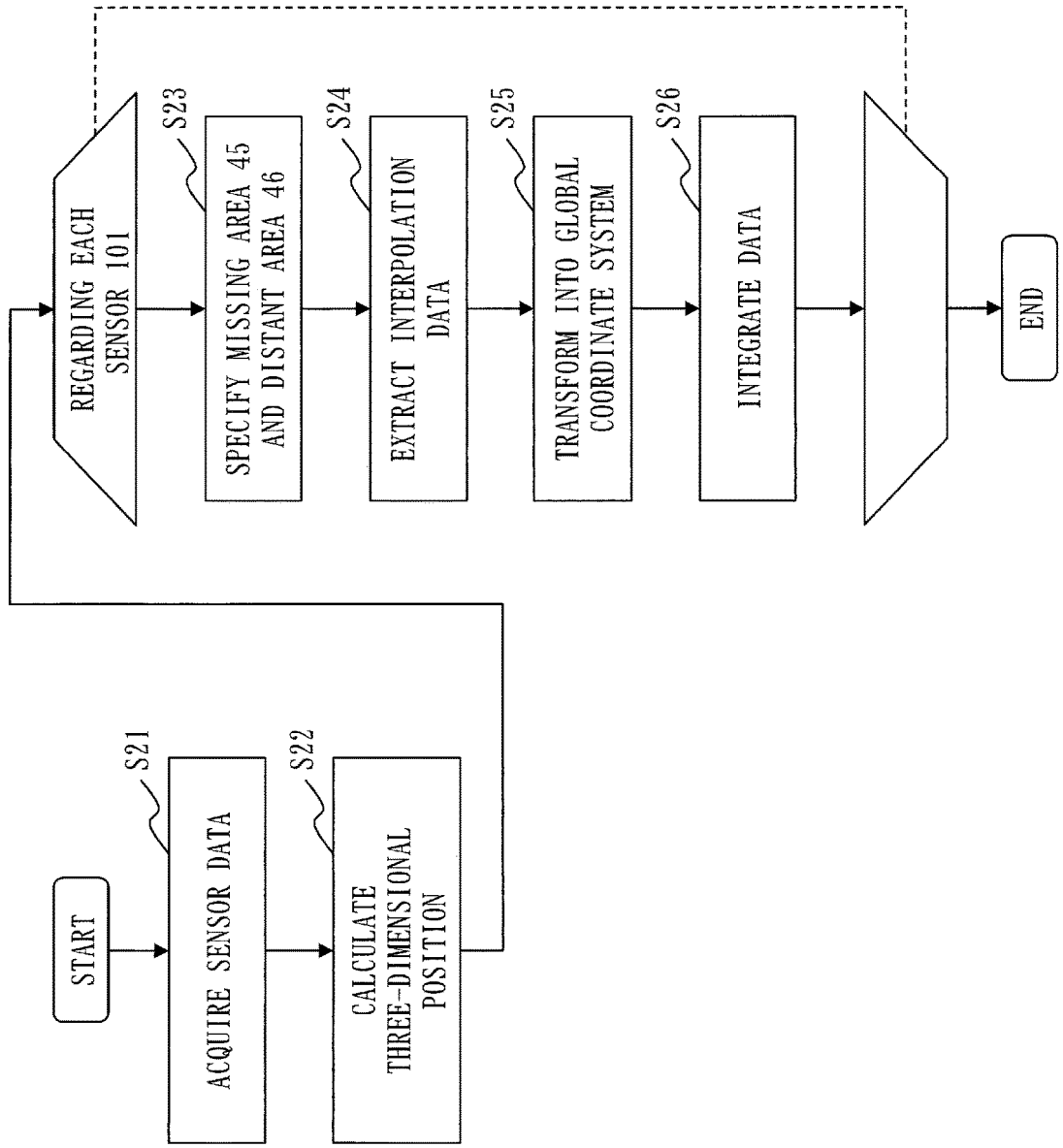
FIG. 11 is a flowchart illustrating an operation of the sensor data integration device 10 according to a second embodiment.

With reference to FIG. 11, an operation of the sensor data integration device 10 according to a second embodiment will be described.

The operation of the sensor data integration device 10 according to the second embodiment corresponds to a sensor data integration method according to the second embodiment. Further, the operation of the sensor data integration device 10 according to the second embodiment corresponds to a process of a sensor data integration program according to the second embodiment.

Processes from a step S21 through a step S22 are the same as the processes from the step S11 through the step S12 of FIG. 6. Further, processes from a step S25 through a step S26 are the same as the processes from the step S15 through the step S16 of FIG. 6.

(Step S23: Area Specification Process) The missing area specification unit 23 specifies a missing area 45, as with the first embodiment.

The missing area specification unit 23 specifies as a distant area 46 an area which is distant from a sensor in charge for equal to or more than a second threshold value among an area detected by assigned data in a coverage area 42 assigned to the sensor in charge.

(Step S24: Interpolation Data Extraction Process)

The interpolation data extraction unit 23 extracts in a step S24 sensor data whereby the missing area 45 and the distant area 46 are specified, and the sensor data acquired by a sensor 101 other than the sensor in charge, as interpolation data.

An extraction method of interpolation data regarding the distant area 46 is the same as the extraction method of the interpolation data regarding the missing area 45. That is, it is only necessary to specify angles ($\theta$, $\omega$) of sensor data of two points on the both ends of the distant area 46, and to extract the sensor data between the two points as interpolation data.

\*\*\*Effect of Second Embodiment\*\*\*

As described above, the sensor data integration device 10 according to the second embodiment interpolates not only the missing area 45 but also the distant area 46 by using the sensor data acquired by the other sensor 101.

Regarding the sensor 101 such as a LiDAR, as a distance from the sensor 101 increases, a distance between adjacent points increases; hence, a shape specified is increasingly roughened. However, since the distant area 46 which is distant from the sensor 101 is interpolated with the sensor data acquired by the other sensor 101, it is possible to suitably specify the shape of an object.

REFERENCE SIGNS LIST

10: sensor data integration device; 11: processor; 12: memory; 13: storage device; 14: sensor interface; 15: processing circuit; 21: data acquisition unit; 22: position calculation unit; 23: missing area specification unit; 24: interpolation data extraction unit; 25: position transformation unit; 26: detection data generation unit; 31: sensor position storage unit; 32: coverage area storage unit; 41: relative position information; 42: coverage area; 43: detectable area; 44: overlapping area; 45: missing area; 46: distant area; 100: moving body; 101: sensor

The invention claimed is:

1. A sensor data integration device comprising:
a sensor interface configured to receive sensor data from a plurality of sensors;
processing circuitry to:
write, for each of the plurality of sensors, the received sensor data as assigned data for the respective sensor;
specify, in a coverage area assigned to a sensor in charge to detect a position, a missing area that is not detected by the sensor in charge, based on the assigned data written for the sensor in charge;
calculate an angle in a coordinate system of another one of the plurality of sensors other than the sensor in charge corresponding to the missing area based on relative position information;
extract, as interpolation data, the assigned sensor data written for the another sensor on the calculated angle;
transform a coordinate system of the assigned data written for the sensor in charge and the coordinate system of the interpolation data into a global coordinate system; and
generate detection data of the coverage area by the sensor in charge by integrating the assigned data and the extracted interpolation data based on the global coordinate system,
wherein the above processed are performed for each of the plurality of sensors as a sensor in charge.

2. The sensor data integration device as defined in claim 1, wherein the processing circuitry specifies, as the missing area, an area wherein a distance between positions indicated in the assigned data being adjacent to each other is equal to or more than a first threshold value.

3. The sensor data integration device as defined in claim 2, wherein the processing circuitry specifies, as a distant area, an area distant from the sensor in charge equal to or more than a second threshold value, in an area detected by the assigned data, and also extracts, as the interpolation data, sensor data that detects the specified distant area, the sensor data being acquired by a sensor other than the sensor in charge.

4. The sensor data integration device as defined in claim 3, wherein the processing circuitry generates the detection data by synthesizing the assigned data and the interpolation data after converting the assigned data and the interpolation data into data of a same coordinate system.

5. The sensor data integration device as defined in claim 2, wherein the processing circuitry generates the detection data by synthesizing the assigned data and the interpolation data after converting the assigned data and the interpolation data into data of a same coordinate system.

6. The sensor data integration device as defined in claim 1, wherein the processing circuitry specifies, as a distant area, an area distant from the sensor in charge equal to or more than a second threshold value, in an area detected by the assigned data, and also extracts, as the interpolation data, sensor data that detects the specified distant area, the sensor data being acquired by a sensor other than the sensor in charge.

7. The sensor data integration device as defined in claim 6, wherein the processing circuitry generates the detection data by synthesizing the assigned data and the interpolation data after converting the assigned data and the interpolation data into data of a same coordinate system.

8. The sensor data integration device as defined in claim 1, wherein the processing circuitry generates the detection data by synthesizing the assigned data and the interpolation data after converting the assigned data and the interpolation data into data of a same coordinate system.

9. A sensor data integration method comprising:
writing in memory, for each of a plurality of sensors, sensor data received from a sensor as assigned data for the senor;
specifying, in a coverage area assigned to a sensor in charge to detect a position, a missing area that is not detected by the sensor in charge, based on the assigned data written for the sensor in charge;
calculating an angle corresponding to the missing area in a coordinate system of another one of the plurality of sensors other than the sensor in charge based on previously stored relative Position information;
extracting, as interpolation data, the assigned sensor data written for the another sensor on the calculated angle;
transforming a coordinate system of the assigned data written for the sensor in charge and the coordinate system of the interpolation data into a global coordinate system; and
generating detection data of the coverage area of the sensor in charge by integrating the assigned data and the interpolation data based on the global coordinate system,
wherein the above processes are performed for each of the plurality of sensors as a sensor in charge.

10. A non-transitory computer readable medium storing a sensor data integration program to make a computer perform:
a writing process to write, for each of a plurality of sensors, sensor data received from a sensor as assigned data for the sensor;
a missing area specification process to specify, in a coverage area assigned to a sensor in charge to detect a position, a missing area that is not detected by the sensor in charge, based on the assigned data written for the sensor in charge;
a calculation process to calculate an angle corresponding to the missing area in a coordinate system of another one of the plurality of sensors other than the sensor in charge based on previously stored relative position information;
an interpolation data extraction process to extract, as interpolation data, the assigned sensor data written for the another sensor on the calculated angle;
a transformation process to transform a coordinate system of the assigned data written for the sensor in charge and the coordinate system of the interpolation data into a global coordinate system; and
a detection data generation process to generate detection data of the coverage area of the sensor in charge by integrating the assigned data, and the interpolation data extracted by the interpolation data extraction process based on the global coordinate system,
wherein the above processes are performed for each of the plurality of sensors as a sensor in charge.

* * * * *